United States Patent [19]

Taylor et al.

[11] Patent Number: 5,375,509
[45] Date of Patent: Dec. 27, 1994

[54] DOUGH BALL PREPARATION TABLE

[75] Inventors: Russell G. Taylor, Pleasanton; Ezra Theys, San Mateo; Raymond W. Harold, Modesto; Frank Knafelc, Lafayette; Ronald E. Heiskell, Tracy; Karl A. Krause, Mokelumne Hill, all of Calif.

[73] Assignee: The Clorox Company, Oakland, Calif.

[21] Appl. No.: 839,137

[22] Filed: Feb. 20, 1992

[51] Int. Cl.⁵ .................. A23G 3/00; A21C 3/06; A21C 11/00; A23P 1/00
[52] U.S. Cl. .................. 99/450.6; 83/887; 99/353; 99/450.1; 425/307; 425/321; 425/513
[58] Field of Search .................. 99/353, 355, 450.1, 99/450.2, 450.7, 450.8, 494, 485, 537; 83/887, 886; 425/105, 102, 305.1, 307, 297, 321, 327, 332, 519, 372, 425, 516, 320, 514, 511, 513

[56] References Cited

U.S. PATENT DOCUMENTS

| | | | |
|---|---|---|---|
| 2,048,470 | 7/1936 | Sanborn. | |
| 2,070,850 | 2/1937 | Trabold. | |
| 2,249,787 | 7/1941 | Savage. | |
| 3,603,270 | 9/1971 | Tangei. | |
| 3,748,937 | 7/1973 | Long | 83/887 |
| 3,759,650 | 9/1973 | Griner et al. | 425/307 X |
| 3,858,497 | 1/1975 | Ishida | 99/450.6 |
| 3,961,569 | 6/1976 | Kenyon et al. | 99/451 |
| 4,126,706 | 11/1978 | Hilton | 426/438 |
| 4,171,197 | 10/1979 | Sato | 425/321 |
| 4,336,010 | 6/1982 | Thompson | 425/307 |
| 4,368,019 | 1/1983 | Thompson | 425/141 |
| 4,427,357 | 1/1984 | Anderson | 425/333 |
| 4,511,318 | 4/1985 | Kolodesh et al. | 99/485 X |
| 4,647,468 | 3/1987 | Pinto | 425/307 X |
| 4,656,908 | 4/1987 | Elwood | 99/450.2 |
| 4,750,413 | 6/1988 | Voegtlin | 99/353 |
| 4,996,915 | 3/1991 | Morikawa et al. | 99/353 X |
| 5,018,439 | 5/1991 | Bordin | 425/321 X |
| 5,078,585 | 1/1992 | Morikawa et al. | 425/372 X |

FOREIGN PATENT DOCUMENTS

| | | | |
|---|---|---|---|
| 3534 | 1/1916 | United Kingdom. | |
| 2238506 | 6/1991 | United Kingdom | 425/293 |

Primary Examiner—Timothy F. Simone
Attorney, Agent, or Firm—Harry A. Pacini; Michael J. Mazza; Joel J. Hayashida

[57] ABSTRACT

The present invention discloses and provides a dough preparation and dividing machine capable of receiving substantially spherical, filled encrusted dough balls and forming them, with a minimum of dough working, into flattened, "D"-shaped configurations to increase the output of a conventional encrusting and co-extruding device for filled, encrusted dough ball products.

5 Claims, 7 Drawing Sheets

DOUGH BALL PREPARATION TABLE

BACKGROUND OF THE INVENTION

This invention relates in general to a filled dough ball shaping apparatus employed to form filled dough ball bodies of desired configuration prior to freezing, drying, baking, frying, steaming, or otherwise cooking the items. More specifically, the present invention relates to a filled dough ball receiving, shaping, dividing and forming machine for making filled dough ball bodies of a predetermined weight and configuration of an initially filled and encrusted, spherically-shaped dough ball into smaller shaped and sealed, filled and encrusted dough balls in a continuous manner. The present invention not only cuts larger spherical filled dough balls, but compresses, seals and cuts filled and encrusted dough balls into symmetrically shaped halves.

Food processing machines exist which are capable of combining up to three food materials of different tastes and textures into a multitude of shapes and sizes. Meat, potatoes, confectionery, cakes, sugar confectionery, pet foods, ice cream, health foods, snacks, vegetables and the like, can all be encapsulated, enclosed or encrusted. Oftentimes baking, drying or freezing requires specially tailored, filled dough balls to be prepared and accurately encrusted or encapsulated with filling for a specialized use. However, if a desired shape, such as a "D"-shape, is needed, existing technology and equipment is not readily adaptable to prepare such items. Therefore, by the present device, it is possible to increase the output of the standard encrusting and co-extruding processing and production system and to obtain, at the same time, the desired flattened "D"-shaped filled product.

PRIOR ART

In prior patent U.S. Pat. No. 3,603,270, there is described and disclosed a machine for making filled dough products providing a pair of dough hoppers having rollers at the bottoms thereof for extruding two sheets of dough. Between the dough hoppers is a filling material hopper. The two sheets of dough are led to a pair of cutter-crimper rollers. One of the rollers has a pocket into which portions of one of the dough sheets is positioned to assume the pocket configuration thereof. Filling material is added into this formed pocket, then the two dough sheets are brought together so as to enclose the filling. Crimping is accomplished to join the two sheets together about the filling. This machine produces one filled product for each passage. The unique feature of the instant invention is that from each single filled dough ball, two filled shaped products are produced.

SUMMARY OF THE INVENTION

It is therefore the object of the present invention to disclose and provide a dough preparation and dividing machine capable of receiving substantially spherical filled, encrusted dough balls and forming them, with a minimum of dough working, into flattened, "D"-shaped configurations. Another object of this invention is to provide in the foregoing device an improved sealing and cutting mechanism employed in cutting the flattened, filled, encrusted dough balls. Yet another object of the present invention is to disclose and provide a dough forming and divider machine which compresses the spherical filled, encrusted dough ball into two symmetrical halves having only a layer of dough between two filled halves. Another of the present invention is to increase the output of a conventional encrusting and co-extruding device for filled, encrusted dough ball products.

Generally stated, the present invention is a filled, encrusted dough ball receiving, shaping, dividing, sealing and cutting device including provisions in association with an end feed discharge conveyor from a conventional encrusting and co-extruding filled dough ball forming machine to a set of inclined infeed rollers for pre-shaping the individual filled, encrusted dough balls into generally uniform spherical dimensions prior to advancing the dough balls to a moving lower conveyor belt. After the filled spherical dough balls are deposited onto the lower conveyor belt, the moving belt transports the spherical dough balls into an area where an inclined overhead compression conveyor belt with spaced V-belts laminated to the overhead belt contacts the moving dough balls and generally presses the dough balls to deform the spheres into flat, circular, filled pads, at the time the V-belt ribs depending from the overhead conveyor divide the flattened dough ball into symmetrical halves as the dough ball travels through the narrow gap between the lower conveyor belt and the overhead conveyor belt. During the closest contact with the depending V-belt ribs, the filled dough ball transported on the lower belt is locally pushed downward and evenly to both sides. A first set of wheels with a blunt edge crimps and seals the cut edge of the slightly flattened filled dough ball, now a substantially sealed "D"-shaped product. A second set of cutting wheels severs the symmetrical deformed halves of the flattened filled dough ball. Optionally, a combined crimping or cutting wheel can be used to cut and seal the flattened dough ball.

As a further part of the present invention, an improved adjustable centering guide mechanism is employed in association with the lower conveyor belt and the overhead compression belt with spaced apart V-belts. The adjustable centering guides allow the dough balls to be positioned directly in the middle of the spaced apart V-belts to center the dough ball as it enters the space between the overhead compression belt and the lower conveyer belt.

It is believed that those skilled in the art will attain a more complete understanding of the present invention in filled dough ball processing and forming machines, as well as recognition of additional objects and advantages thereof, from the consideration of the following detailed explanation of a preferred exemplary embodiment thereof. Reference will be made to the appended sheets of drawings, which will be described as follows.

BRIEF DESCRIPTION OF THE DRAWINGS

FIGS. 5A, 5B and 5C are external views depicting a filled dough ball at various stages through the machine of this invention.

FIG. 6A, 6B and 6C are cut-away views depicting a filled dough ball at various stages through the machine of this invention.

DESCRIPTION OF THE PREFERRED EXEMPLARY EMBODIMENT

Figure 1A:
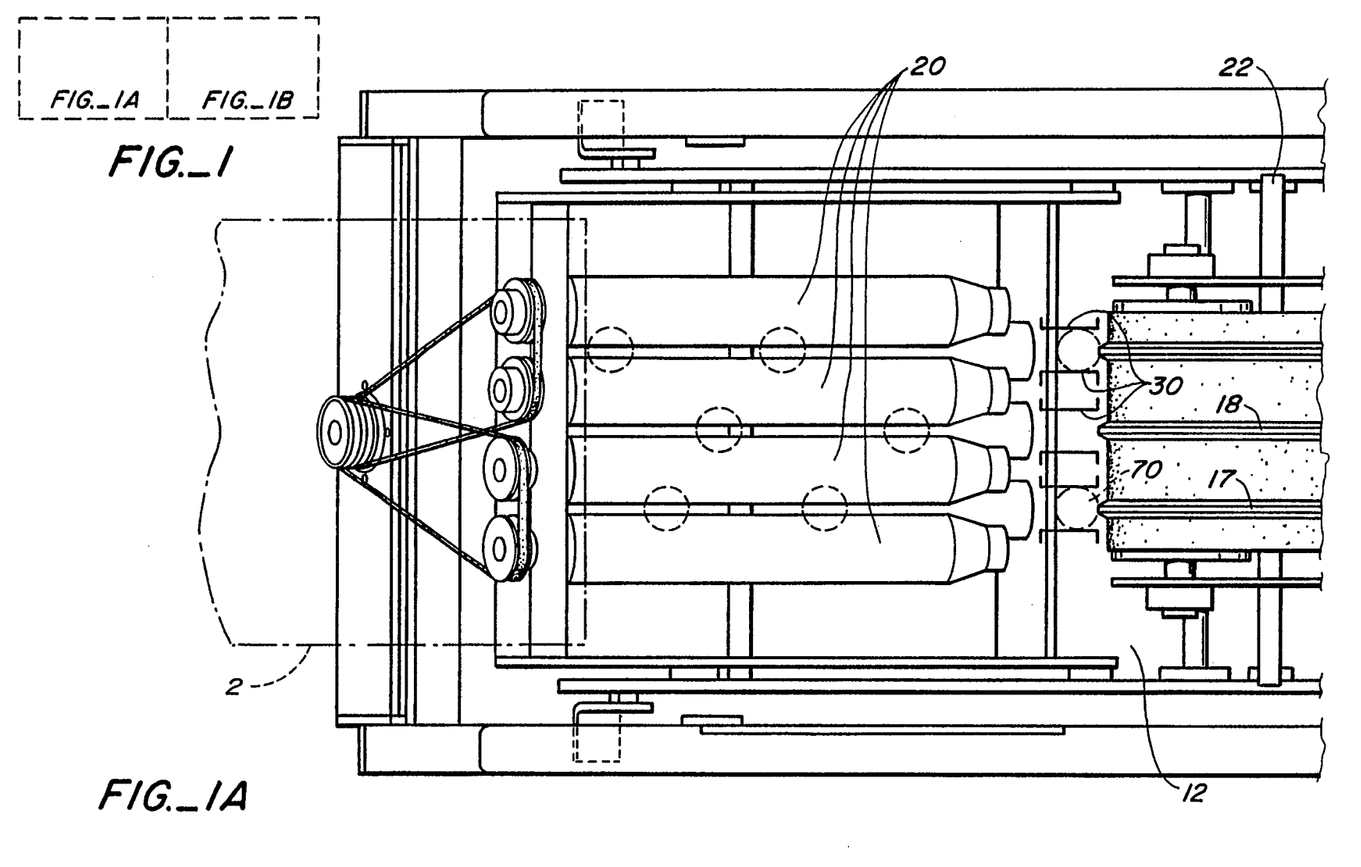
FIG. 1 depicts a top plan view of the dough ball preparation table illustrating construction and mode of operation. This view illustrates the manner in which spherical filled dough balls are treated to become two filled, shaped products.
Figure 1B:
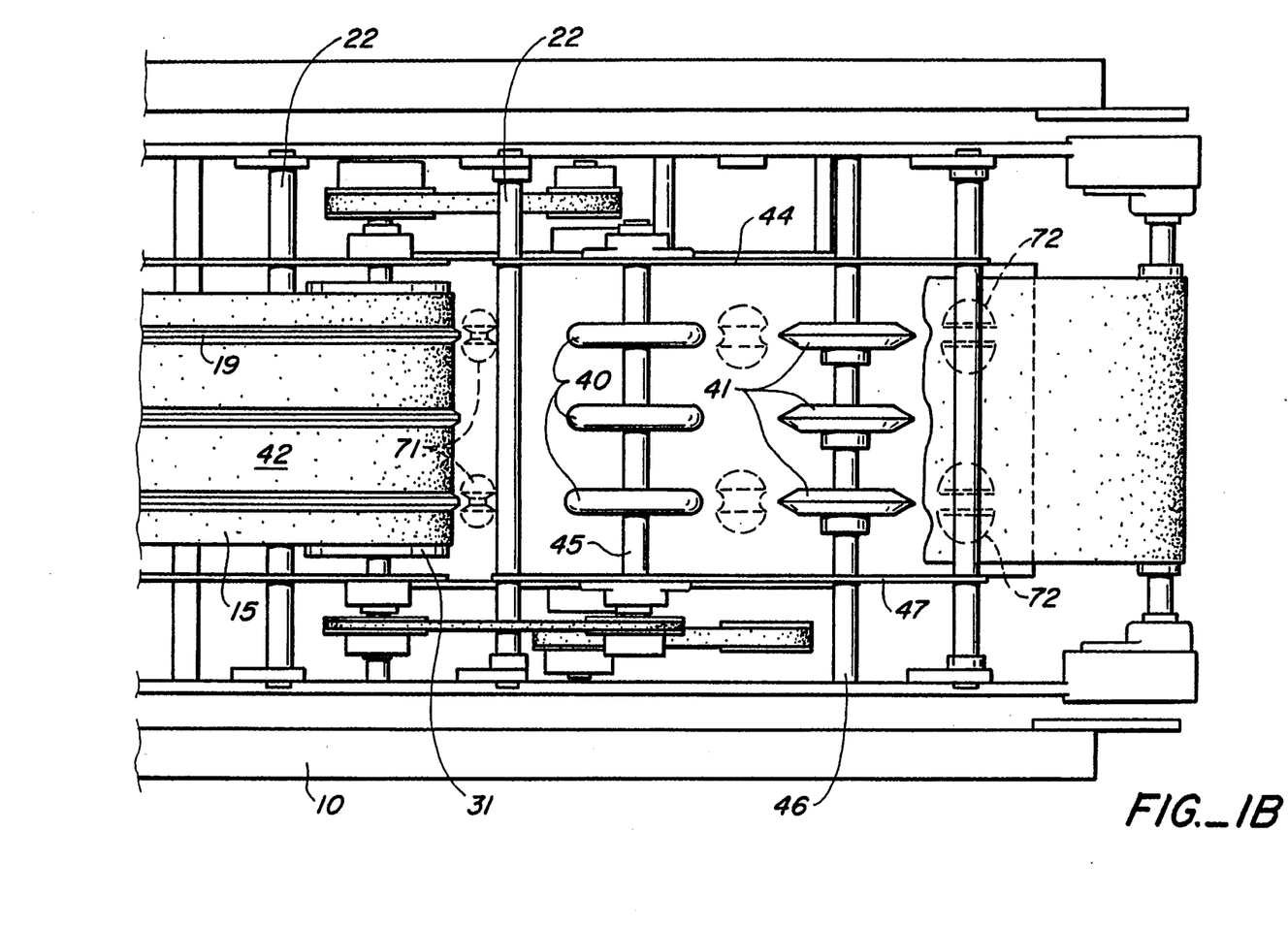

Referring initially to FIG. 1, an exemplary embodiment of a filled, encrusted dough ball receiving, shaping, dividing, sealing and cutting machine is illustrated for making dough bodies of a pre-determined size and configuration. Initial spherically shaped dough balls are prepared in a continuous manner on a machine frame. In the exemplary embodiment, a dough-forming means indicated generally at 2 is employed. Except as otherwise stated herein, a general filled spherical dough ball preparation device, the disclosure of which is incorporated herewith by this reference. The filled spherical dough ball forming means cooperate together with the present machine, having additional novel components discussed hereinafter, to produce an improved filled dough ball preparation table for receiving, shaping, dividing, and forming encrusted product as compared to those disclosed in the prior art.

Figure 2:
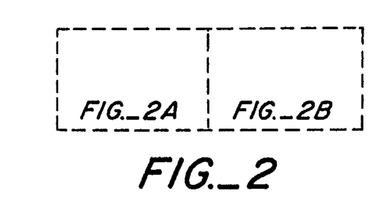
FIG. 2 depicts a side elevation view of a preferred exemplary embodiment of the machine in accordance with the present invention.
Figure 2A:
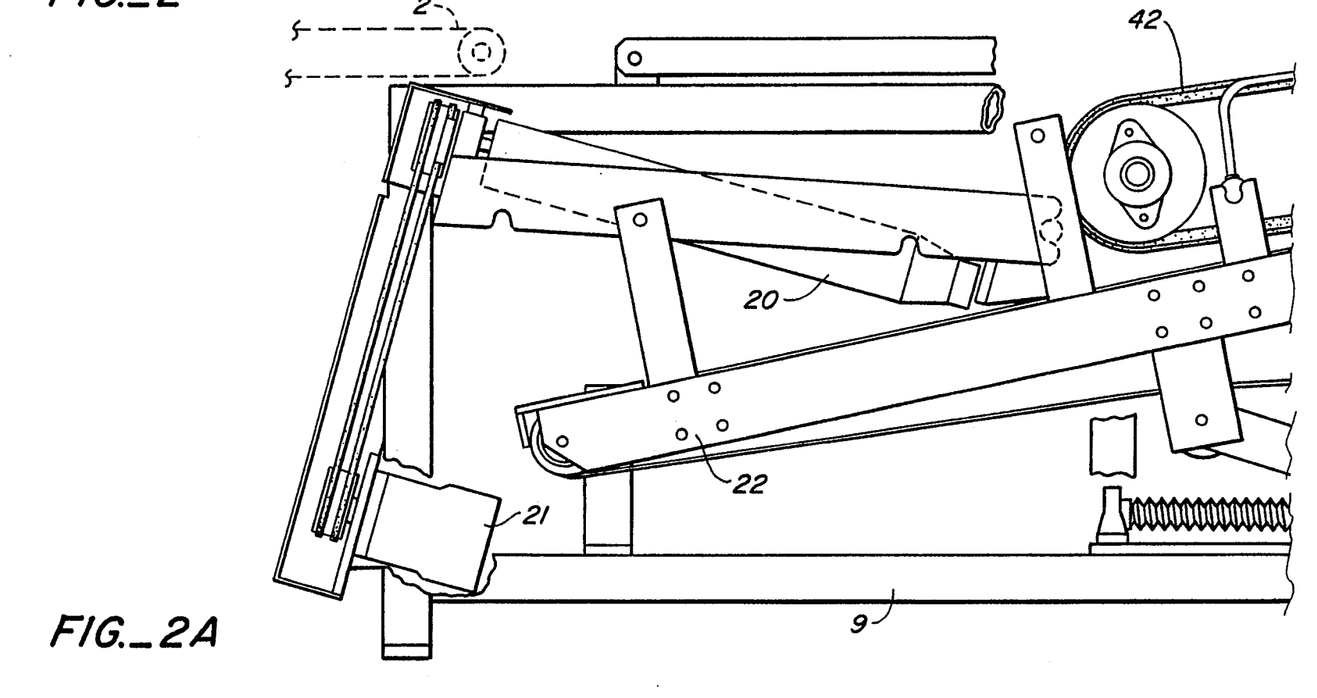
Figure 2B:
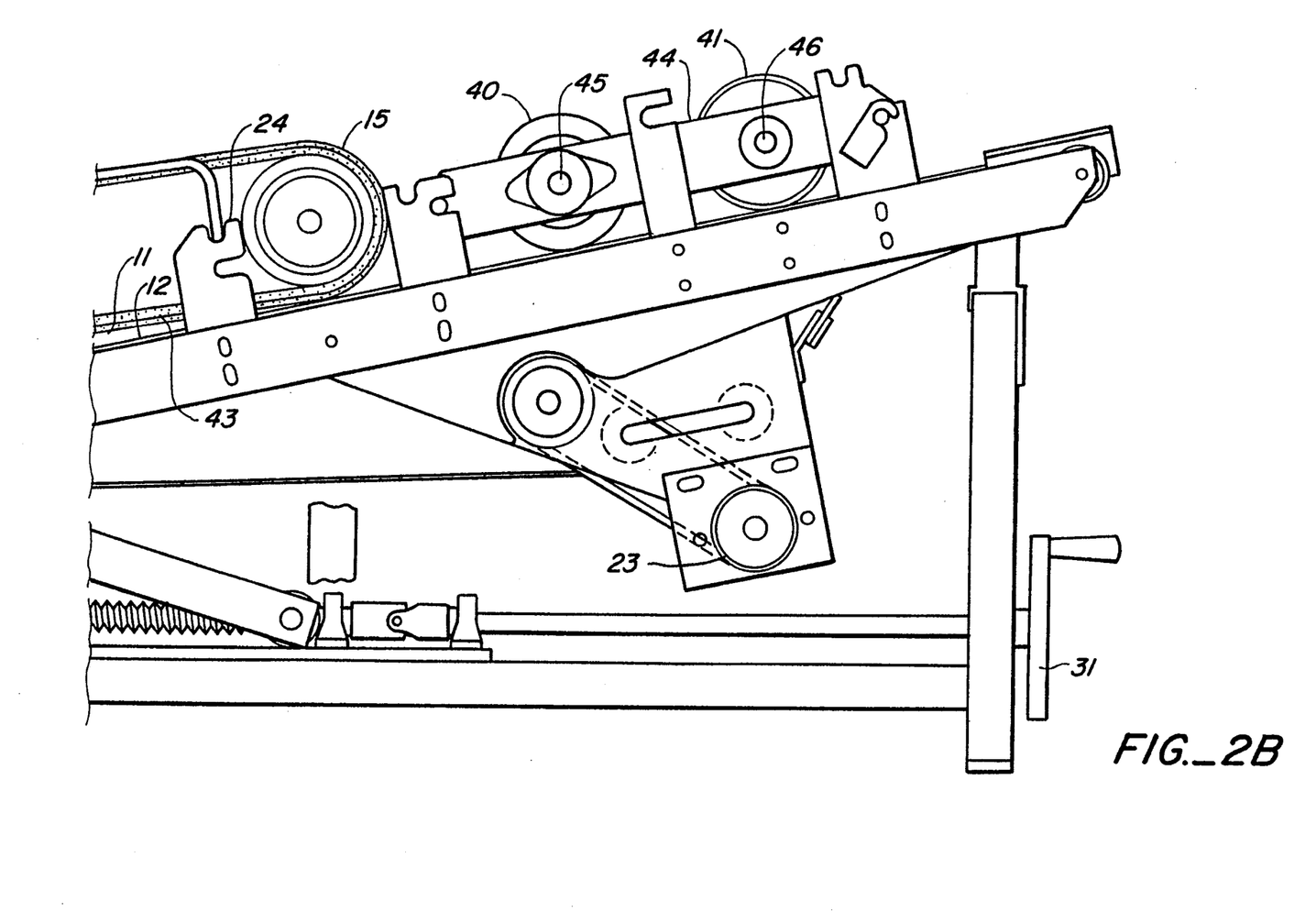
Figure 3:
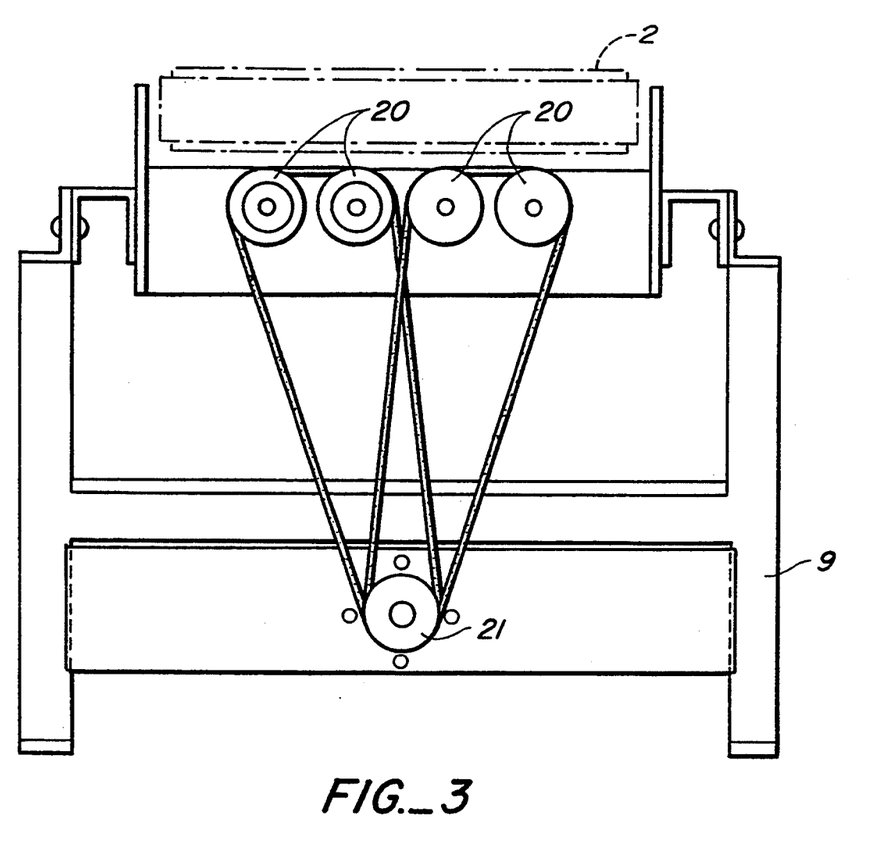
FIG. 3 depicts a rear end view of the apparatus of FIG. 1.
Figure 4:
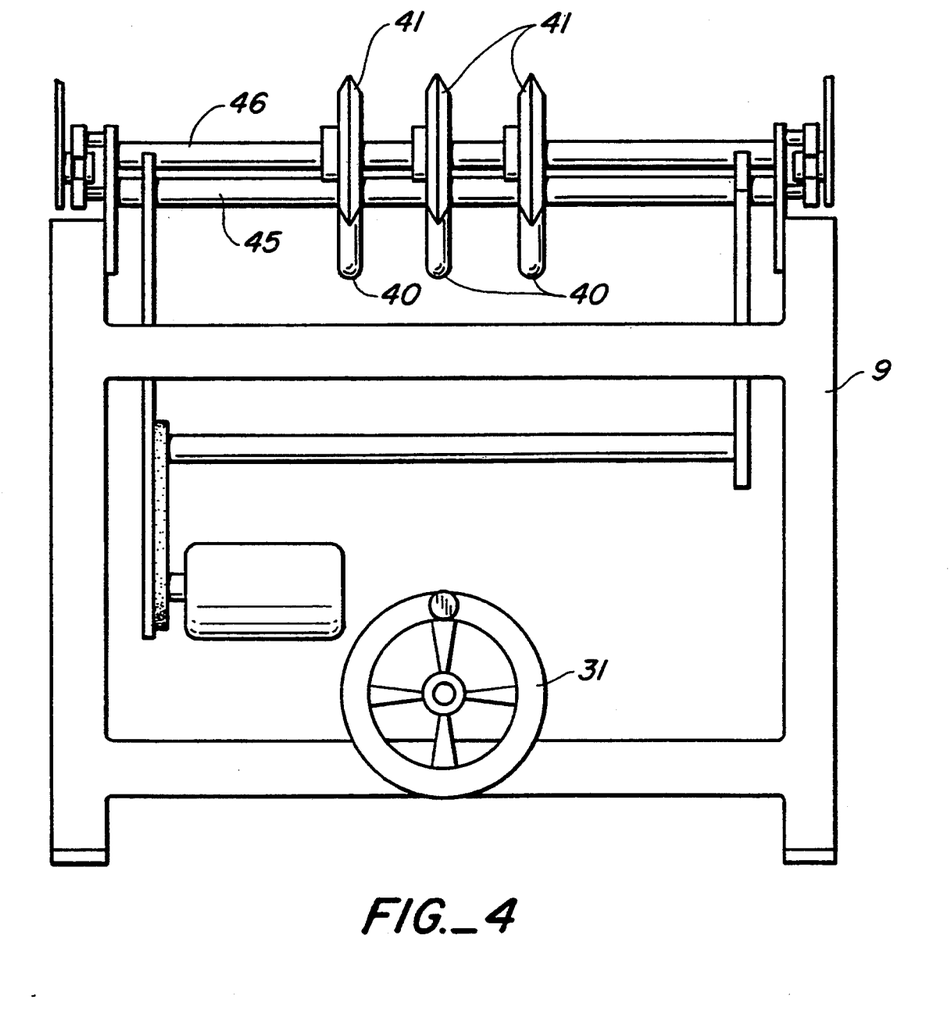
FIG. 4 depicts a front end view of the apparatus of FIG. 2.
Figure 5A:
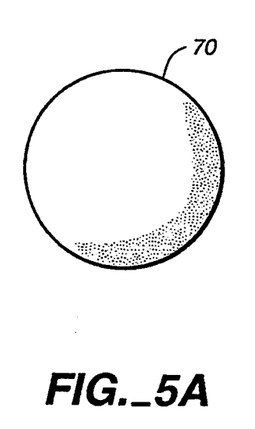
FIG. 5A is a filled spherical dough ball.
Figure 5B:
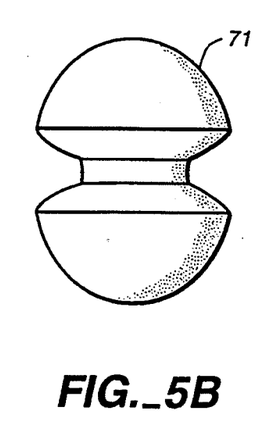
FIG. 5B is a product scored by the V-belt compressed center portion.
Figure 5C:
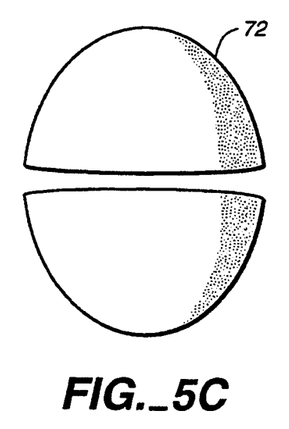
FIG. 5C is a severed product.
Figure 6A:
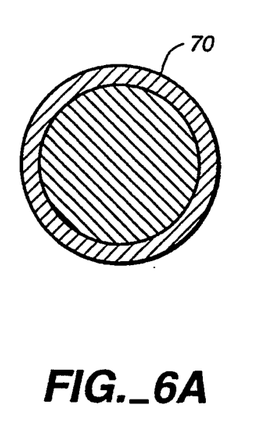
FIG. 6A is a filled, spherical dough ball.
Figure 6B:
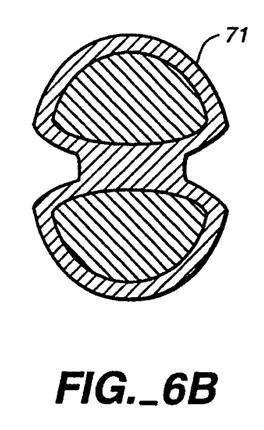
FIG. 6B is a scored product with compressed center portions.
Figure 6C:
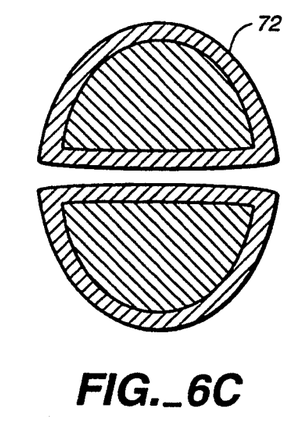
FIG. 6C is a severed, filled product.

The exemplary dough preparation device, indicated generally at 10, includes a frame 9 of conventional support having mounted thereon a first or lower endless conveyor belt 12 substantially the length of the frame 9. The lower conveyor belt 12 is angled upwards in the direction of its movement. Positioned above the lower conveyor belt 12 is an upper endless conveyor belt 15 substantially the same width as the lower conveyor belt. The upper or overhead belt 15 has spaced apart V-belts 17, 18, 19 affixed thereon with V-belt ribs 17, 18, 19 depending therefrom and disposed to run on the lower side 16 of the conveyor belt in the same direction as the upper conveyor belt. The upper conveyor belt 15 is angled downward toward the upper surface of the lower conveyor belt so as to provide a compression space between the upper conveyor belt and lower conveyor belt surfaces.

Positioned on the frame at the upper end of the frame there is included downwardly inclined rotating elongated infeed rollers 20 which cooperate with a discharge conveyor from a conventional filled dough ball encrusting machine 2. Representative in the exemplary apparatus in the Figures is a series of four inclined rotating feeder rollers 20 rotating in the same direction and speed which comprise three lanes of filled dough balls from the filled dough ball encrusting device corresponding to the three nip areas between the rotating rollers. Means for centering 30 the dough balls on the lower conveyor belt is positioned between the lower end of the inclined infeed rollers 20 and the area covered by the inclined overhead or upper compression conveyor belt 15. The means for centering the dough balls orient the spherical filled dough balls to correspond to the V-belts 17, 18, 19 depending from the overhead compression belt 15. The centering means provide for a lane for each dough ball discharged from the rotating infeed rollers 20 onto the lower conveyor belt 12.

As a further part of the present invention, means for guiding and centering 30 the dough balls is employed in association with the lower conveyor belt 12 and the overhead compression belt 15 with spaced apart V-belts 17, 18, 19. Adjustable centering guides 30 allow the dough balls to be positioned directly in the middle of a path aligned with the spaced apart V-belts 17, 18, 19 to center the dough ball as it enters the space 11 between the overhead compression belt 15 and the lower conveyor belt 12.

The infeed rollers 20 are positioned on the frame 10 above and inclined in the direction of travel of the lower conveyor belt 12. For rotation of the infeed rollers 20, the elevated upper end of the infeed rollers are engaged by a set of pulleys operated by the drive motor 21 in unison to rotate the infeed rollers 20 in the same direction. The discharge conveyor from a co-extruder and encrusting machine 2 deposits the formed, filled larger spherical dough balls directly onto the elevated upper end of the infeed roller 20 arrangement.

The lower conveyor belt 12 is slightly inclined upward in the direction of its travel, supported on the frame by roller and bracket assembly 22 spaced throughout the length of the lower belt, and supporting the lower belt. The lower conveyor belt 12 is driven by a motor/pulley assembly 23. The same motor/pulley assembly 23 is connected to the upper conveyor belt 15 and driven by the same motor. The upper conveyor belt 15 travel is inclined downward. The upper conveyor belt 15 is supported on a frame 24 with rollers and brackets above the lower conveyor belt 12. The movement of the upper conveyor belt 15 provides an upper surface 42 and a lower surface 43. The lower surface 43 faces the lower conveyor belt 12. Further, there is provided an inclined compression space 11 between the upper conveyor belt 15, lower surface 43 and the lower conveyor belt 12. Hence the upper conveyor belt 15 can be considered as a compression belt. The lower surface 43 of the upper conveyor belt 15 faces the upper surface of the lower conveyor belt 12. The rotation or movement of the upper conveyor belt 15 is such that the lower surface moves in the same direction and at the same speed as the upper surface of the lower conveyor belt. Hence, objects on the lower conveyor belt 12 move in unison with the lower surface of the upper conveyor belt 15.

The upper end of the upper conveyor belt 15 is in spaced proximity to the lower end of the infeed rollers 20. In the spaced area on the lower conveyor belt separating the upper end of the upper conveyor belt 15 and the lower end of the infeed rollers 20, are spaced apart centering guide means 30 for aligning the dough balls on the lower conveyor belt, substantially in line centered on the spaced apart depending V-belts 17, 18, 19 on the upper conveyor belt 15.

DESCRIPTION OF THE PREFERRED EXEMPLARY EMBODIMENT

An exemplary embodiment of the present dough divider device is indicated generally at 10. As particularly contemplated with the present invention, a scored or grooved compressed dough ball 71 exiting the narrow gap or compression space 11 between the upper conveyor belt 15 and the lower conveyor belt 12 is transported on the lower conveyor belt 12 to a means for cutting the grooved dough ball 71 apart. Means for cutting the grooved dough balls apart include any cutting means, including a rotary cutting wheel and optionally crimping assembly indicated generally at 44. Such crimping and cutting wheels include a series of wheels on drive shafts 45, 46, which extend across the lower conveyor belt 12 spaced apart from the narrow gap or compression space 11 between the upper conveyor belt 15 and lower conveyor belt 12. The drive shafts 45, 46 are driven by motor 23.

Mounted on appropriate support means 47 positioned away from the inclined end of the upper or compression belt 15 are a series of cutting wheels 41 corresponding to the lanes defined by the depending V-belt 17, 18, 19 compressions on the surface of the upper or compression belt 15. The cutting wheels 41 can be tapered to provide a crimping action as well as cutting. Preferably, a separate set of crimping wheels 40 can be positioned apart from the cutting wheels 41 along the track of the travel of the lower conveyor belt 12. Both the cutting wheels 41 and crimping wheels 40 are disposed above the lower conveyor belt 12 so as to interact with the lower conveyor belt 12 and provide a sealing action and cutting action to the cut halves of the dough ball.

The cutting wheels 41 may be designed to cut through the layer of dough left between the two divided halves in the grooved space 72 and at the same time crimp the cut dough to seal the area which has been cut, thereby creating a seal between the top and bottom layer of the compressed filled dough ball. Optionally, separate means for dividing the grooved dough balls may be provided in tandem. That is, for example, a first set of wheels may be used to crimp the dough in the area which has been cut, thus sealing the top and bottom layer of dough that effectively contains the filling within the dough. A second set of wheels may be used to cut through the layer of dough left between the two grooved halves after they exit the compression area between the upper conveyor belt 15 and lower conveyor belt 12.

Means for guiding and centering 30 the dough balls 70 discharged from the rotating infeed rollers 20 onto the lower conveyor belt 12 can be of various design. As particularly contemplated within the present invention, means for guiding and centering the dough balls on the lower conveyor belt 12 prior to entering the compression space 11 between the upper conveyor belt 15 and the lower conveyor belt 12 and in line with the middle of the spaced apart V-belts 17, 18, 19 is a series of spaced apart guide bars 30 depending downward over the lower conveyor belt 12 and cooperating therewith. Two series of guide bars each are attached to and suspended above the lower conveyor belt 12 disposed downwardly sufficient to interact with and contact a dough ball 71 on the lower conveyor belt 12. The first series of guide bars are spaced apart to conform to defining a path directed to the spaced apart V-belts 17, 18, 19 on the upper conveyor belt 15 substantially at the lower end of the inclined infeed rollers 20 and the area covered by the inclined overhead or upper compression conveyor belt 15. The means for centering the dough balls orient the spherical filled dough balls to correspond to the V-belts 17, 18, 19 depending from the upper compression belt 15. The centering means provides for a lane for each dough ball 71 discharged from the rotating infeed rollers 20 onto the lower conveyor belt 12.

It is particularly contemplated within the present invention that upon rotation of the infeed rollers 20, the filled dough ball transported on the lower conveyor belt 12 through the narrow gap 11 between the upper conveyor belt 15 and the lower conveyor belt 12 the spherical dough ball 70 is locally pushed downward and evenly to both sides to produce a flattened loaf. A first set of crimping wheels 40 with a blunt edge further crimps and seals the cut edge of the slightly filled dough ball now substantially a flattened, sealed, "D"-shaped product. A second set of cutting wheels 41 severs the symmetrically deformed halves of the flattened filled dough ball.

As illustrative of specific guide means 30 disposed at the input end of the upper conveyor belt 15, a first series of guide bars are spaced apart to effectively define a path between and centered on the spaced apart V-belts 17, 18, 19 on the upper conveyor belt 15. A second series of guide bars 30 are disposed a short distance downstream from the first series of guide bars 30. The second series of guide bars 30 are used to refine the alignment and center the dough balls 70 with the V-belts 17, 18, 19 on the upper conveyor belt 15. The guide bars 30 as a centering and guide means effectively act as gates or guideways to shunt and align the dough balls with the V-belts 17, 18, 19 on the upper conveyor belt 15.

In operation, after the dough ball is deposited on the lower conveyor belt 12, it is moved along to the guide means. Each dough ball will contact a first guide bar in the first series of guide bars. The dough ball will be directed to one side or the other at the bar. A first approximation of alignment and centering with a V-belt 17, 18, 19 on the upper conveyor belt 15, following this within a short distance, the moving dough ball on the lower conveyor belt 12 then encounters the second set of guide bars whereby the dough ball will be gently positioned into a definite centered path leading to a V-belt 17, 18, 19 on the upper conveyor belt 15.

The preparation table device 10 is positionable in a production line. The spherical filled dough balls 70 are deposited onto a set of inclined infeed rollers 20 and then onto the lower end of a continuous, slightly inclined lower conveyor belt 12. The lower conveyor belt 12 receives a plurality of transversely spaced rows of randomly oriented, filled dough balls 70. The dough ball on the lower conveyor belt 12 is subjected to a series of guide bars 30 to assist in orientation of the dough ball 70 with a path leading to a section where a second conveyor belt 15 downwardly inclined and positioned above the lower conveyor belt 12 to form a narrow gap 11 between the ends of the upper conveyor belt 15 and lower conveyor belt 12, the upper conveyor belt 15 having equally spaced apart depending V-belts 17, 18, 19 attached to the surface thereof. The dough ball is transported by the lower conveyor belt 12 into the narrowing gap 11 between the upper conveyor belt 15 and the lower conveyor belt 12 until it is flattened and grooved by the depending V-belts 17. 18, 19 and exits the narrow gap between the lower end of the upper conveyor belt 15 and the lower conveyor belt 12. At this point, the dough ball is a flattened, circular loaf 71 with a grooved center mark thereon. The resulting shaped product is then transported to the cutting and crimping area where the symmetrical halves are severed, resulting in two substantially "D"-shaped products. Final products are then handled in various ways for final disposition, such as baking, drying or freezing.

The structure of this invention is capable of relatively high speed operation and greatly increases production capacity when compared to prior devices for preparing properly shaped dough filled items.

The resulting shaped product from this process and apparatus will have desirable internal structure shape and filled texture. As material characteristics change, the speed of the operation may be varied to achieve the desired shaping. Variation of the speed is essentially an empirical process. Proper shaping and grooving can be achieved with various types of dough materials. The drive rollers for the various belts preferably include variable speed controls to adjust relative velocities during the setup for particular materials. Such speed controls are well known in the art.

While primarily adapted for the food products industry to shape cookies, bread dough, pasta and the like, the dough ball preparation apparatus can be used to shape any generally deformable, plastic or dough-like material. The device can, therefore, have applicability in a wide variety of manufacturing fields other than the food industry.

Various modifications and changes may be made to the component elements, the materials, the relative arrangements of the structure illustrated in the drawings and described hereinabove, which is given by way of example, without departing from the basic principles and scope of the present invention.

What is claimed is:

1. A dough ball preparation table comprising
   (a) a frame;
   (b) a discharge conveyor from an encrusting filled dough ball machine;
   (c) downwardly inclined rotating elongated infeed rollers mounted above said frame and said infeed rollers rotating in the same direction and speed, disposed to receive dough balls from said discharge conveyor and to deliver said dough balls to a conveyor belt;
   (d) a lower conveyor belt having a lower end and an upper end inclined upwards and having a run the length of the frame wherein said infeed rollers are disposed over the lower end of the lower conveyor belt to receive dough balls from said infeed rollers;
   (e) an upper compression conveyor belt disposed above the lower conveyor belt and inclined downwardly towards said lower conveyor belt and lower conveyor belt forming an inclined narrowing gap at the lower end of the lower conveyor, said upper conveyor belt having spaced apart V-belts securely affixed to the surface of the upper conveyor belt with V-belt ribs depending therefrom;
   (f) means for center positioning said dough balls on the lower conveyor belt prior to said upper conveyor belt said dough balls on the lower conveyor belt to correspond substantially centered to the depending V-belt ribs whereby said dough balls are scored by the depending V-belt ribs;
   (g) means for crimping and cutting the scored dough balls into two substantially equal sealed portions after exiting the narrow gap between the upper conveyor belt and lower conveyor belt;
   (h) drive means for operating said upper and lower conveyor belts and the rotating infeed rollers.

2. The machine of claim 1 wherein
   (a) a first motor is provided for operating said upper and lower conveyor belts; and
   (b) a second motor and associated drive means are provided for operating the infeed rollers.

3. The machine of claim 1 wherein the means for center positioning of said dough balls in a series of spaced apart guide bars depending from a support means above the lower conveyor belt position between the infeed rollers and the upper conveyor belt, thereby defining centered lanes to the depending V-belt ribs on the upper conveyor belt.

4. The machine of claim 1 wherein the means for crimping and cutting the scored dough balls on the lower conveyor belt comprises a series of combined crimping and cutting wheels mounted on support means on the frame and aligned with the depending V-belt ribs.

5. The machine of claim 1 wherein the means for crimping and cutting the scored dough balls on the lower conveyor belt comprises a series of crimping wheels and a series of cutting wheels mounted on support means on the frame and aligned with the depending V-belt ribs.

* * * * *